(12) United States Patent
Gyotoku

(10) Patent No.: US 10,924,693 B2
(45) Date of Patent: Feb. 16, 2021

(54) IMAGE SENSOR AND IMAGE CAPTURING APPARATUS

(71) Applicant: CANON KABUSHIKI KAISHA, Tokyo (JP)

(72) Inventor: Takashi Gyotoku, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/437,535

(22) Filed: Jun. 11, 2019

(65) Prior Publication Data

US 2019/0387187 A1 Dec. 19, 2019

(30) Foreign Application Priority Data

Jun. 19, 2018 (JP) .............................. JP2018-116380
Apr. 18, 2019 (JP) .............................. JP2019-079569

(51) Int. Cl.
*H04N 5/355* (2011.01)
*H04N 5/374* (2011.01)
*H04N 5/378* (2011.01)
*H04N 5/359* (2011.01)
*H04N 5/341* (2011.01)
*H04N 5/369* (2011.01)

(52) U.S. Cl.
CPC ......... *H04N 5/35554* (2013.01); *H04N 5/341* (2013.01); *H04N 5/3597* (2013.01); *H04N 5/378* (2013.01); *H04N 5/379* (2018.08); *H04N 5/3742* (2013.01)

(58) Field of Classification Search
CPC .. H04N 5/341; H04N 5/35554; H04N 5/3597; H04N 5/3742; H04N 5/378; H04N 5/379
See application file for complete search history.

(56) References Cited

U.S. PATENT DOCUMENTS

| 5,929,908 | A | * | 7/1999 | Takahashi | ............ | H04N 19/503 |
| | | | | | | 348/364 |
| 2003/0117520 | A1 | * | 6/2003 | Fossum | .................. | H04N 5/378 |
| | | | | | | 348/364 |
| 2010/0277631 | A1 | * | 11/2010 | Sugiyama | .......... | H04N 5/35581 |
| | | | | | | 348/297 |
| 2013/0221197 | A1 | * | 8/2013 | Shimotsusa | ....... | H01L 27/14601 |
| | | | | | | 250/208.1 |

FOREIGN PATENT DOCUMENTS

JP 2010-279016 A 12/2010

\* cited by examiner

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An image sensor, comprises: a pixel area that includes first and second pixel groups each constituted by a plurality of pixels; first and second output channels that output image signals obtained from the first and second pixel groups, respectively; and a driver that performs drive according to a first drive method in which the first pixel group is alternately exposed in a medium exposure period and a short exposure period in a first cycle so that a first and second image signals are read out, and in which the second pixel group is exposed in a long exposure period in a second cycle longer than the first cycle so that a third image signal is read out. The reading out of the third image signal and reading out of the first or the second image signal are performed in parallel.

5 Claims, 14 Drawing Sheets

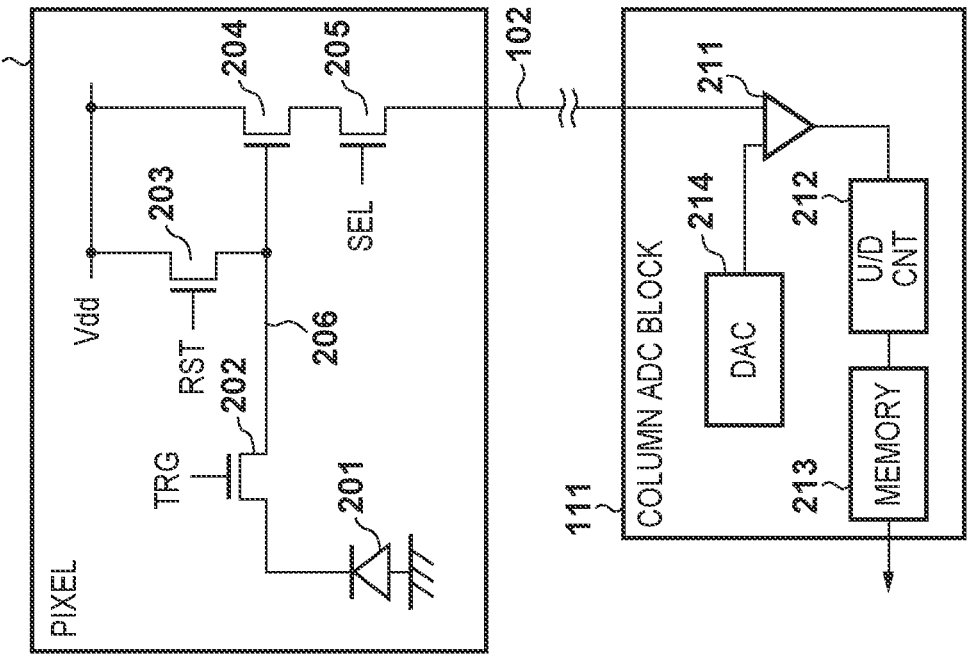
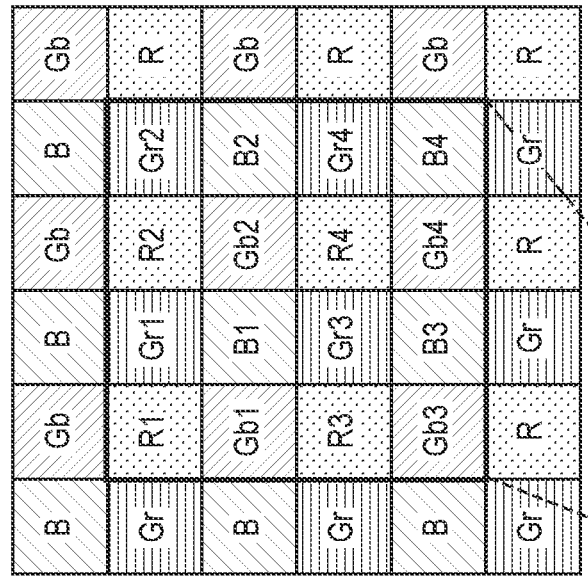

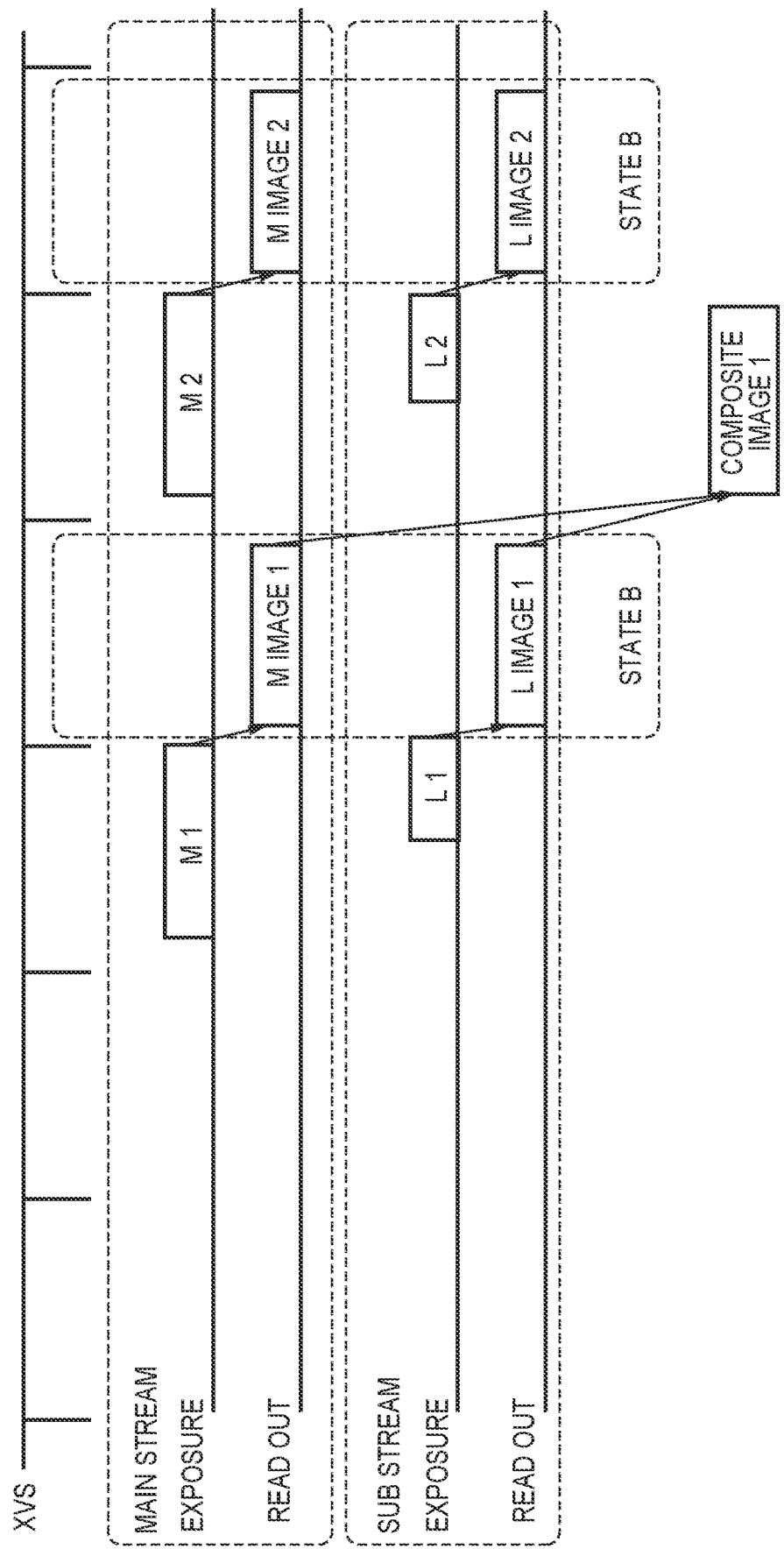

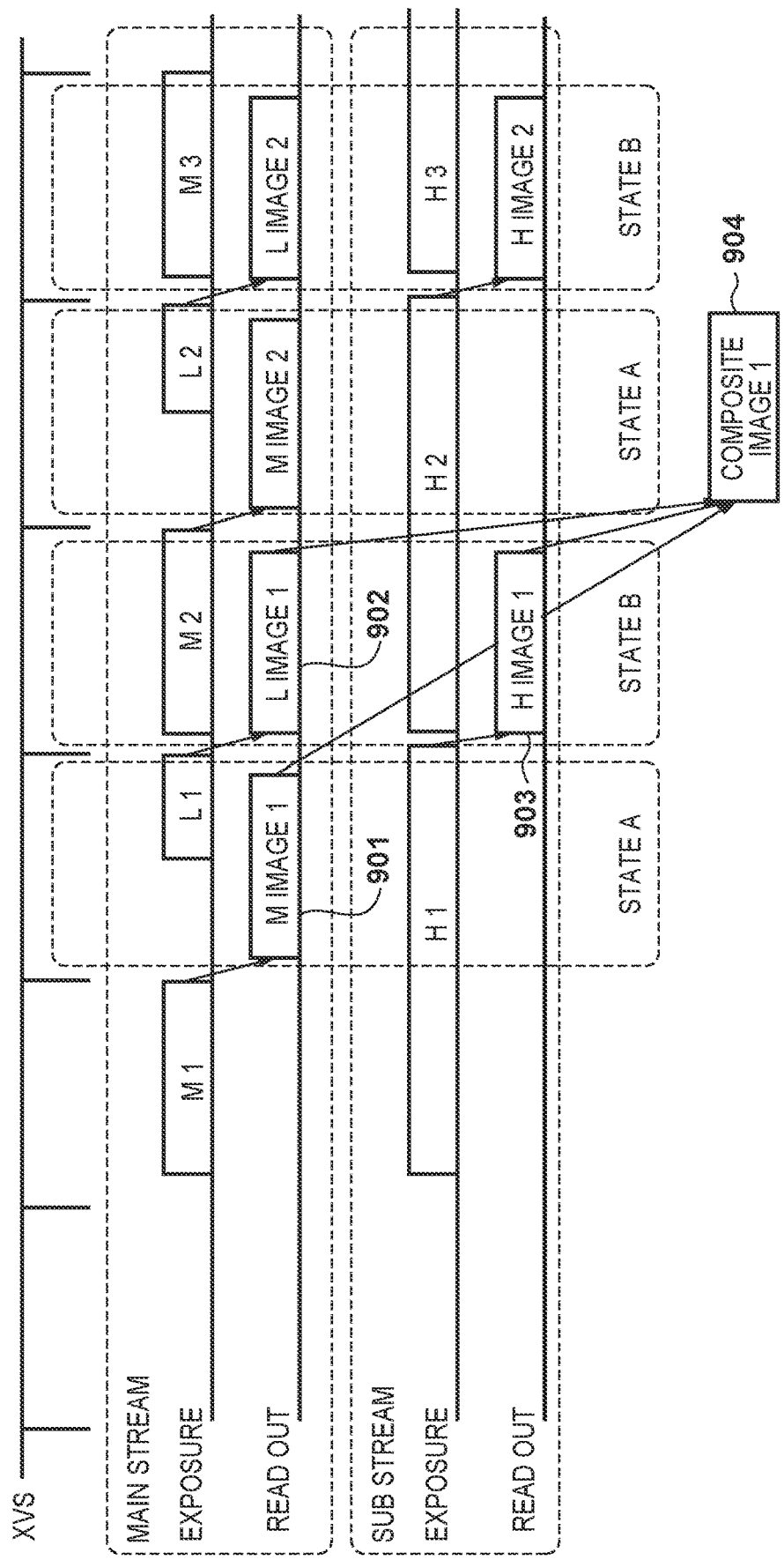

| PATTERN | EXPOSURE CONTROL | | | |
|---|---|---|---|---|
| | Nth FRAME | | (N + 1)th FRAME | |
| | MAIN STREAM | SUB STREAM | MAIN STREAM | SUB STREAM |
| A | OVER (H) | UNUSED | PROHIBIT SETTING | CORRECT (M) |
| B | CORRECT (M) | UNDER (L) | UNUSED | UNUSED |
| C | CORRECT (M) | OVER (H) | UNDER (L) | PROHIBIT SETTING |

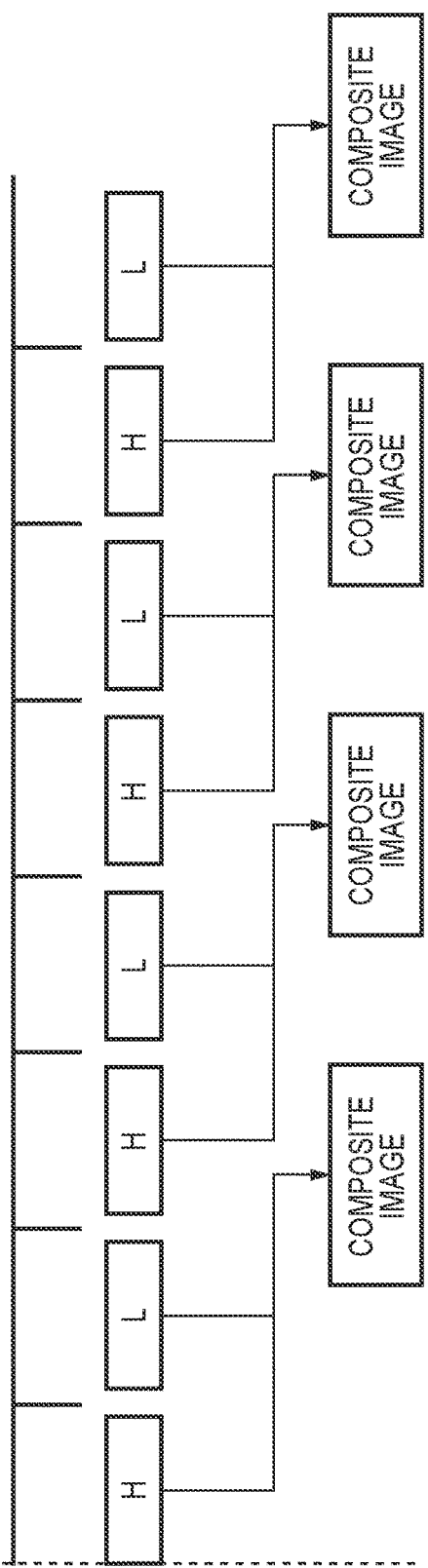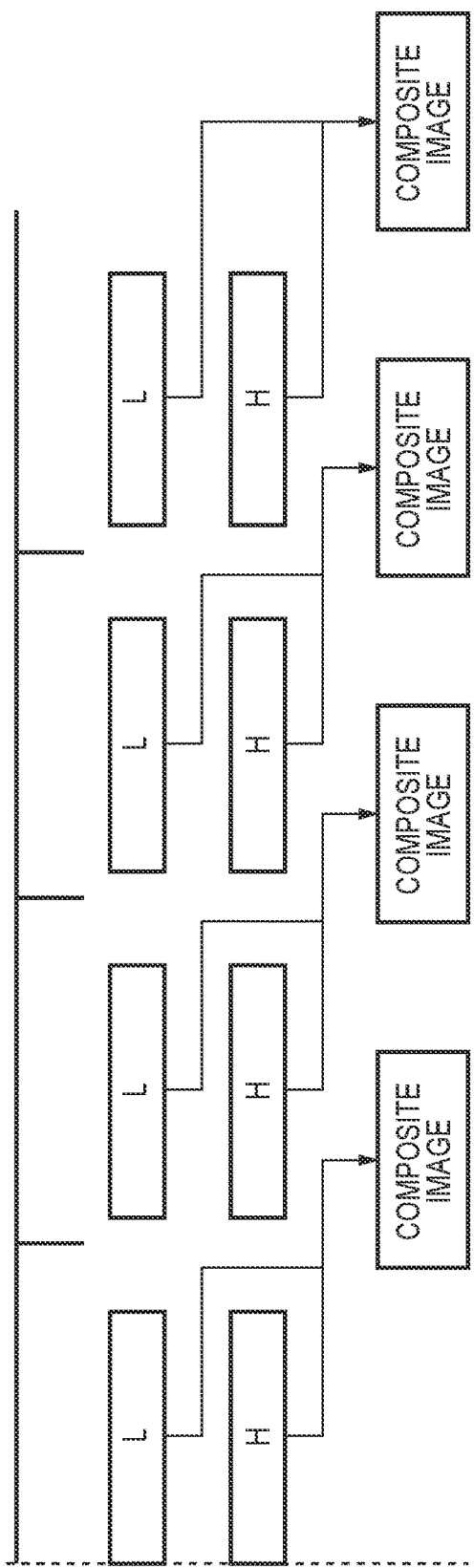

IMAGE SENSOR AND IMAGE CAPTURING APPARATUS

BACKGROUND OF THE INVENTION

Field of the Invention

The present invention relates to image sensors and image capturing apparatuses.

Description of the Related Art

In recent years, a technology called high dynamic range (HDR) compositing has been proposed as a technique for obtaining images of a broader dynamic range using an image sensor constituted by a CCD or a CMOS. With HDR compositing, an image with less blown out highlights and an image with less blocked up shadows are obtained by varying the exposure conditions and shooting multiple images, then compositing suitably exposed areas from each image, thereby suppressing blown out highlights and blocked up shadows, and enabling an image to be obtained that has excellent tonality from dark areas through bright areas.

Furthermore, in a case of carrying out video HDR shooting in which HDR compositing is applied to video shooting, this can be achieved for example by repetitively alternating shooting with different exposures in each video frame.

FIG. 13A illustrates a timing by which an overexposure and an underexposure are switched frame-by-frame to obtain alternately an overexposed image (H) and an underexposed image (L) and a video having an HDR effect is shot by compositing these two images.

However, when shooting a moving object using this method, sometimes a deterioration in image quality is incurred in that an afterimage is produced in the composite images due to accumulation period gaps between the frames.

To address this, Japanese Patent Laid-Open No. 2010-279016 proposes a technique in which an HDR image is created from the same frame by obtaining image signals of two different exposure periods by controlling exposure period line-by-line in the image sensor.

FIG. 13B illustrates a case where the overexposed image (H) and the underexposed image (L) are obtained by controlling exposure line-by-line and outputting resultant signals. In this way, images of different exposures can be obtained in the same frame, and therefore deterioration in image quality due to afterimages does not occur.

However, with the method described in Japanese Patent Laid-Open No. 2010-279016, the HDR effect is weakened since an exposure difference between the overexposed image and the underexposed image is limited within a single frame period (16.6 ms when 60 fps). Also, to further heighten the HDR effect, it is desirable to composite a greater number of images of different exposures.

For example, rather than the case where only the two images, namely the underexposed image and the overexposed image, are composited, the HDR effect can be heightened further by compositing three images by adding a properly exposed image.

However, when attempting to obtain images of three different exposure periods using the method described in Japanese Patent Laid-Open No. 2010-279016, there is an issue of image quality deteriorating undesirably since the number of lines used to form each of the three images is reduced.

SUMMARY OF THE INVENTION

The present invention has been made in consideration of the above situation, and suppresses deterioration in image quality caused by afterimages to obtain high dynamic range images of excellent quality.

According to the present invention, provided is an image sensor, comprising: a pixel area that includes a first pixel group constituted by a plurality of pixels, and a second pixel group constituted by a plurality of pixels different from the first pixel group; a first output channel that outputs an image signal obtained from the first pixel group; a second output channel that outputs an image signal obtained from the second pixel group; and a driver that performs drive according to a first drive method in which the first pixel group is alternately exposed in a first exposure period and a second exposure period shorter than the first exposure period in a predetermined first cycle so that a first image signal and a second image signal are read out via the first output channel, and in which the second pixel group is exposed in a third exposure period longer than the first exposure period in a second cycle longer than the first cycle so that a third image signal is read out via the second output channel, and in which reading out of the third image signal and reading out of the first or the second image signal are performed in parallel.

Further, according to the present invention, provided is an image capturing apparatus, comprising: an image sensor having: a pixel area that includes a first pixel group constituted by a plurality of pixels, and a second pixel group constituted by a plurality of pixels different from the first pixel group; a first output channel that outputs an image signal obtained from the first pixel group; a second output channel that outputs an image signal obtained from the second pixel group; and a driver that performs drive according to a first drive method in which the first pixel group is alternately exposed in a first exposure period and a second exposure period shorter than the first exposure period in a predetermined first cycle so that a first image signal and a second image signal are read out via the first output channel, and in which the second pixel group is exposed in a third exposure period longer than the first exposure period in a second cycle longer than the first cycle so that a third image signal is read out via the second output channel, and in which reading out of the third image signal and reading out of the first or the second image signal are performed in parallel; and a generator that generates an image having an expanded dynamic range from a plurality of image signals outputted from the image sensor and obtained by performing exposure in a plurality of different exposure periods.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a diagram for describing one example of an addition and decimation pattern according to the embodiment.

FIG. 4A and FIG. 4B are diagrams illustrating an example configuration a pixel and a column ADC block according to the embodiment.

FIG. 11A to FIG. 11C are timing diagrams showing timings of exposure and reading out according to the third embodiment.

FIG. 13A and FIG. 13B are timing charts for describing conventional HDR video shooting.

DESCRIPTION OF THE EMBODIMENTS

Exemplary embodiments of the present invention will be described in detail in accordance with the accompanying drawings.

Figure 1A:
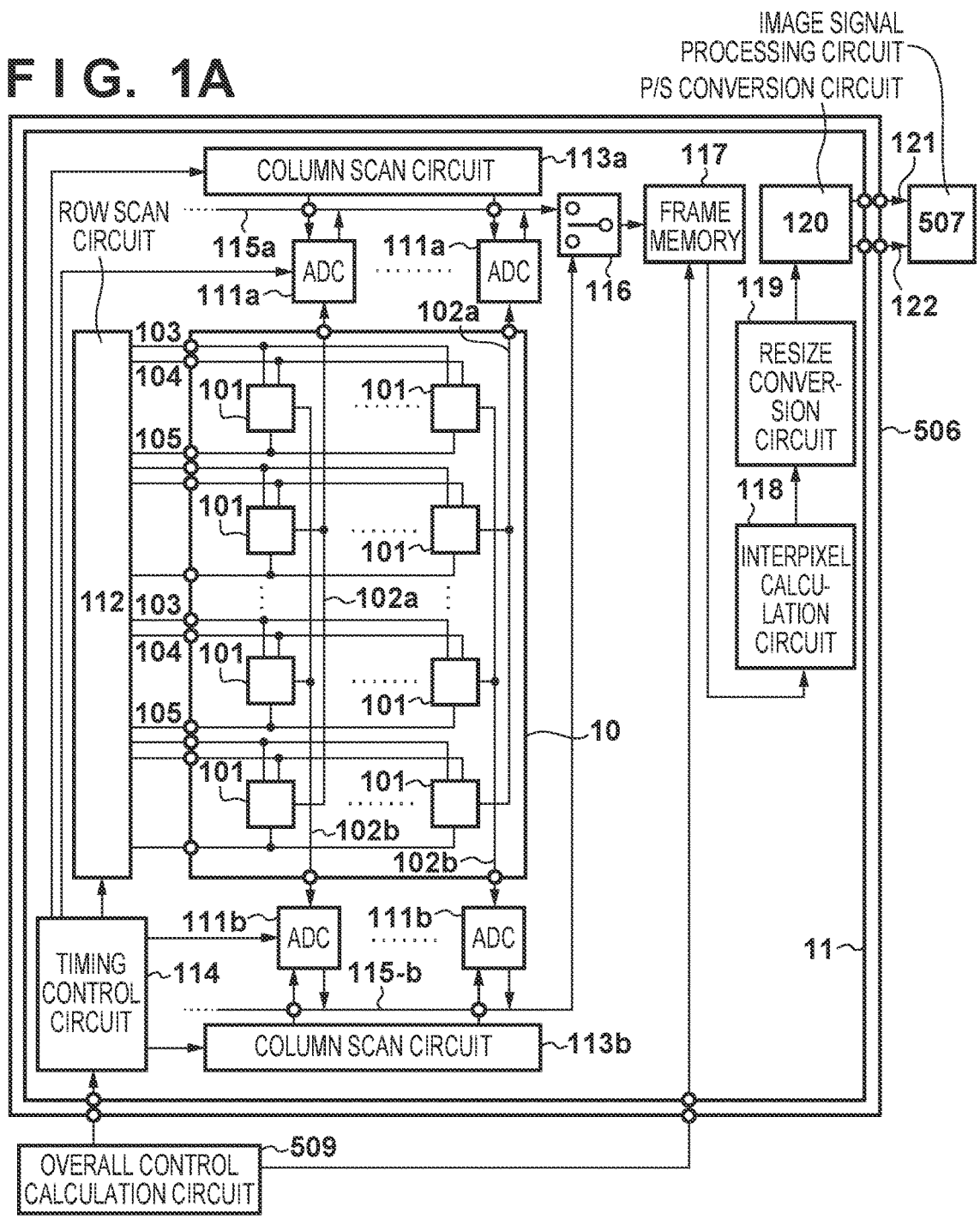
FIG. 1A and FIG. 1B are diagrams showing a configuration of an image sensor according to an embodiment of the present invention.
Figure 1B:
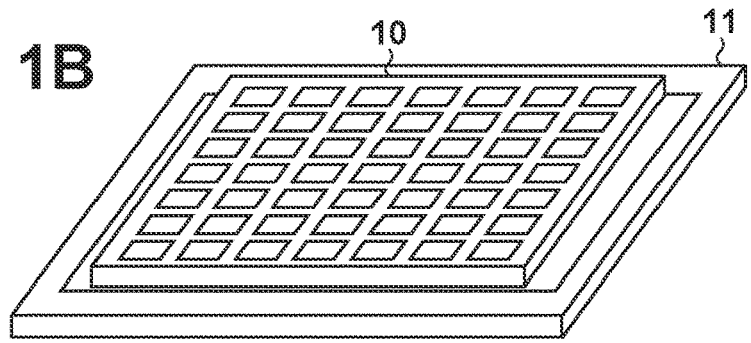

FIG. 1A is a block diagram showing a configuration of an image sensor 506 according to an embodiment of the present invention and FIG. 1B is a schematic diagram showing an external view of the image sensor 506. As shown in FIG. 1B, the image sensor 506 is configured from a first semiconductor chip 10 (imaging layer) and a second semiconductor chip 11 (circuit layer), and the second semiconductor chip 11 and the first semiconductor chip 10 are layered on each other.

A pixel area constituted by multiple pixels 101 arrayed in a matrix is positioned on a light incoming side, that is, a light receiving side of an optical image on the first semiconductor chip 10. Each row of the pixels 101 arrayed in a matrix on the first semiconductor chip 10 is connected to a transfer signal line 103, a reset signal line 104, and a row selection signal line 105 in the horizontal direction (row direction). On the other hand, in the vertical direction (column direction), each column of the pixels 101 is connected to a column output line 102a or 102b. The pixels 101 connected to the column output line 102a are referred to as a first pixel group and the pixels 101 connected to the column output line 102b are referred to as a second pixel group.

Formed on the second semiconductor chip 11 are column ADC blocks 111a and 111b, each provided for each column, and pixel drive circuits such as a row scan circuit 112, column scan circuits 113a and 113b, and a timing control circuit 114. Also formed here are a switching switch 116, a frame memory 117, an interpixel calculation circuit 118, a resize conversion circuit 119, and a parallel/serial (P/S) conversion circuit 120.

Thus, by forming the pixels 101 on the first semiconductor chip 10 and forming the pixel drive circuits, memory circuit, and calculation circuits and the like on the second semiconductor chip 11, the manufacturing processes for the imaging layer and the circuit layer of the image sensor 506 can be divided. As a result, it is possible to achieve finer wiring, increase in speed due to higher densities, further miniaturization, and increase in functionality in the circuit layers.

The charge accumulation and readout of the pixels 101 of the image sensor 506 are controlled by control signals from the row scan circuit 112 via the transfer signal line 103, the reset signal line 104, and the row selection signal line 105. Signals from the pixels 101 of the rows selected by the row scan circuit 112 are read out. In the present embodiment, two output channels are provided.

A first output channel is constituted by the column ADC block 111a, the column scan circuit 113a, and a signal line 115a, and a second output channel is constituted by the column ADC block 111b, the column scan circuit 113b, and a signal line 115b. In this way, signals can be read out in parallel from two rows of the pixels 101.

Signals that have been read out from the pixels 101 of the first pixel group are sent via the column output line 102a of each column to the column ADC block 111a of the first output channel and undergo AD conversion. Signals that have been read out from the pixels 101 of the second pixel group are sent via the column output line 102b of each column to the column ADC block 111b of the second output channel and undergo AD conversion.

Thereafter, the column to be read out by the column scan circuit 113a or 113b is selected sequentially and the image signals that have undergone AD conversion are outputted to the switching switch 116 via the signal line 115a or 115b. It should be noted that it is possible to use either the first output channel or the second output channel to read out signals from the pixels 101 for every other row.

Based on control from an overall control calculation circuit 509, the timing control circuit 114 sends a timing signal to the row scan circuit 112, the column ADC blocks 111a and 111b, and the column scan circuits 113a and 113b.

The switching switch 116 is a switch for selectively outputting the image signals outputted from the signal lines 115a and 115b to the sequential frame memory 117. The frame memory 117 temporarily stores the outputted image signals as image data.

The interpixel calculation circuit 118 performs calculations such as compression processing of the image data in accordance with a drive mode. The resize conversion circuit 119 resizes the image data saved in the frame memory 117 to a required angle of view based on a result outputted by the interpixel calculation circuit 118, and sends this to the P/S conversion circuit 120.

It should be noted that in a case where resize processing and compression processing and the like are not required, transfer is carried out from the switching switch 116 to the P/S conversion circuit 120. The P/S conversion circuit 120 performs parallel-serial conversion on the image data and sends this to an image signal processing circuit 507, which is outside the image sensor 506.

The image sensor 506 and the image signal processing circuit 507 are connected by multiple lanes, for example a main stream 121 is constituted by four Lanes 0-3 and a sub stream 122 is constituted by four Lanes 4-7. In accordance with the drive mode, signals of different pixels or signals of a same pixel are apportioned to the main stream 121 and the sub stream 122 or are outputted from only the main stream 121.

Figure 2:
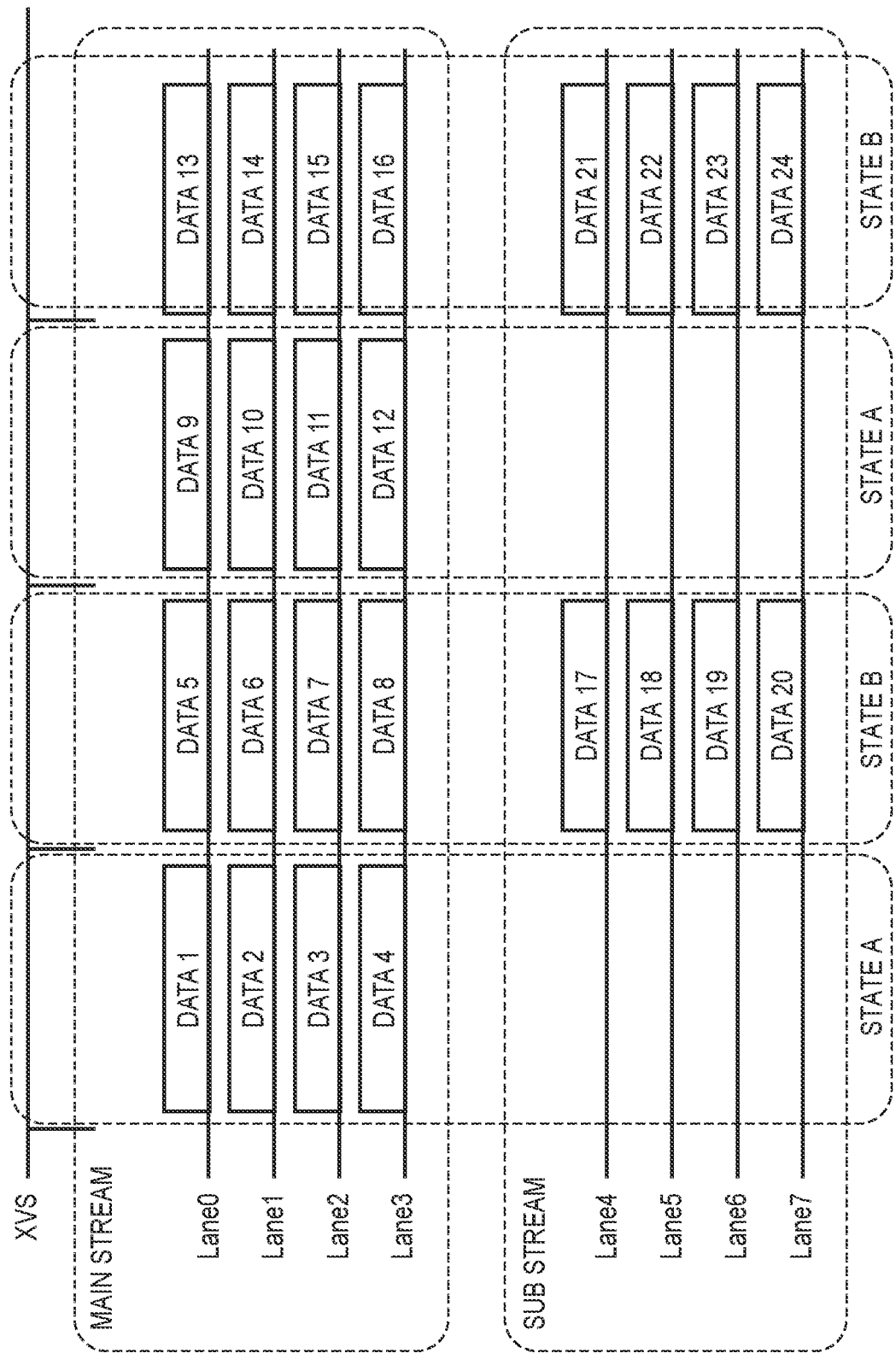
FIG. 2 is a timing diagram showing output timings of the sensor according to the embodiment.

FIG. 2 is a timing chart showing drive timings of the image sensor 506. A state A is a state in which only the four Lanes 0-3 of the main stream 121 are operated to output a single set of frame data from the four lanes. A state B is a state in which the main stream 121 and the sub stream 122 of the image sensor 506 are operated simultaneously.

In a case where the drive mode of the image capturing apparatus is "video HDR mode," a vertical synchronizing signal XVS is inputted from the overall control calculation circuit 509, which is described later, to the image sensor 506, and operation is performed while alternately switching between the state A and the state B in each frame (in a first cycle). Then, three types of images obtained from the image sensor 506, these being captured with overexposure, underexposure, and additionally proper exposure, are apportioned to the main stream 121 and the sub stream 122 and outputted. Here, the data that is outputted is data for video use, and signals from pixels 101 that have undergone addition and decimation are outputted.

FIG. 3 is a diagram for describing one example of an addition pattern. In a case where pixels 101 are covered by a filter of a Bayer array, for four pixels arranged in the horizontal and vertical directions, signals that have undergone addition with the following ratios are outputted:

$$R'=(3 \times R1+R2+1.5 \times R3+0.5 \times R4)/6$$

$$Gr'=(Gr1+3 \times Gr2+0.5 \times Gr3+1.5 \times Gr4)/6$$

$$Gb'=(1.5 \times Gb1+0.5 \times Gb2+3 \times Gb3+Gb4)/6$$

$$B'=(0.5 \times B1+1.5 \times B2+B3+3 \times B4)/6$$

For example, in a case where this is configured with 5,472 pixels horizontally and 3,648 pixels vertically, signals are outputted for 2,736 pixels in which the number of horizontal direction pixels has been reduced by ½, and for 1,538 pixels in which the number of vertical direction pixels has been reduced by ½ and top and bottom pixels have been cut.

FIG. 4A and FIG. 4B are diagrams illustrating a configuration of a single pixel 101 of the image sensor 506 according to the present embodiment and details of a single column ADC block 111. Using FIG. 1A, FIG. 1B, FIG. 4A, and FIG. 4B, an outline description is given of operations of the image sensor 506 according to this embodiment of the present invention. It should be noted that since the column ADC block 111a and the column ADC block 111b have a same configuration, these are shown as column ADC block 111 in FIG. 4A and FIG. 4B.

In FIG. 4A and FIG. 4B, a photodiode (PD) 201 contained in the pixel 101 performs photoelectric conversion and generates electric charges (here, electron) corresponding to received light amount. A transfer transistor 202 is connected between a cathode of the PD 201 and a gate of an amplifier transistor 204, and goes into an ON state due to a transfer pulse φTRG being applied at the gate via the transfer signal line 103. A node electrically connected to the gate of the amplifier transistor 204 constitutes a floating diffusion portion (FD) 206. By having the transfer transistor 202 go into the ON state due to the transfer pulse φTRG, the electric charges generated by photoelectric conversion by the PD 201 is transferred to the FD 206.

A reset transistor 203 has its drain connected to a pixel power supply Vdd and its source connected to the FD 206, and goes into an ON state due to the reset pulse φRST being applied at the gate via the reset signal line 104. By having the reset transistor 203 go into an ON state prior to the transfer of the electric charges from the PD 201 to the FD 206, the charge of the FD 206 is reset to a voltage of the pixel power supply Vdd.

The amplifier transistor 204 has its gate connected to the FD 206 and its drain is connected to the pixel power supply Vdd. Furthermore, a selection transistor 205 has its drain connected to the source of the amplifier transistor 204 and its source connected to the column output line 102, and goes into an ON state due to the selection pulse φSEL being applied at the gate via the row selection signal line 105.

While the selection transistor 205 is in an ON state, first, the electric potential of the FD 206 after being reset by the reset transistor 203 is outputted to the column output line 102 as a reset level. Moreover, by the transfer transistor 202 going into an ON state, the electric potential of the FD 206 after the electric charges have been transferred is outputted to the column output line 102 as a signal level. In the present embodiment, N-channel MOS transistors are used as the transistors 202 to 205.

It should be noted that the configuration of the pixels 101 are not limited to the above-described configuration and, for example, it is also possible to employ a circuit configuration in which the selection transistor 205 is connected between the pixel power supply Vdd and the drain of the amplifier transistor 204. Furthermore, there is no limitation to the above-described four-transistor configuration and, for example, a three-transistor configuration may be used in which combined use is made of the amplifier transistor 204 and the selection transistor 205.

The signal outputted from the pixel 101 via the column output line 102 is transferred to the column ADC block 111. The column ADC block 111 has a comparator 211, an up-down counter (U/D CNT) 212, a memory 213, and a DA converter (DAC) 214.

The column output line 102 is connected to one of the pair of input terminals of the comparator 211 and the DAC 214 is connected to the other. Based on a reference signal inputted from the timing control circuit 114, the DAC 214 outputs a ramp signal whose signal level changes with the passing of time and changes into a ramp shape.

The comparator 211 compares the level of the ramp signal inputted from the DAC 214 and the level of the signal inputted from the column output line 102. The timing control circuit 114 outputs the reference signal to the DAC 214 based on a command from the overall control calculation circuit 509, which is described later.

In a case where the level of the image signal is lower than the level of the ramp signal for example, the comparator 211 outputs a high level comparison signal, and in a case where the level of the image signal is higher than the level of the ramp signal, outputs a low level comparison signal. The up-down counter 212 is connected to the comparator 211 and, for example, performs counting in the period in which the comparison signal is high level or in the period in which it is low level.

Due to this counting process, the output signals of the pixels 101 are converted to digital values. It should be noted that it is also possible to provide an AND circuit between the comparator 211 and the up-down counter 212, and to input a pulse signal to this AND circuit such that the number of pulse signals is counted by the up-down counter 212.

The memory 213 is connected to the up-down counter 212 and stores count values that have been counted by the up-down counter 212. It should be noted that it is also possible in the column ADC block 111 to perform counting on a count value corresponding to the reset level of the pixel 101, after which counting is performed on a count value corresponding to the signal level after a predetermined shooting period, then storing a value of the difference between these in the memory 213. Thereafter, the count value stored in the memory 213 is sent to the switching switch 116 via the signal line 115a or the signal line 115b in synchronization with the signal from the column scan circuit 113 as a digital image signal.

It should be noted that the column ADC block 111 is not limited to the aforementioned configuration and a commonly known column ADC may also be used.

Figure 5:
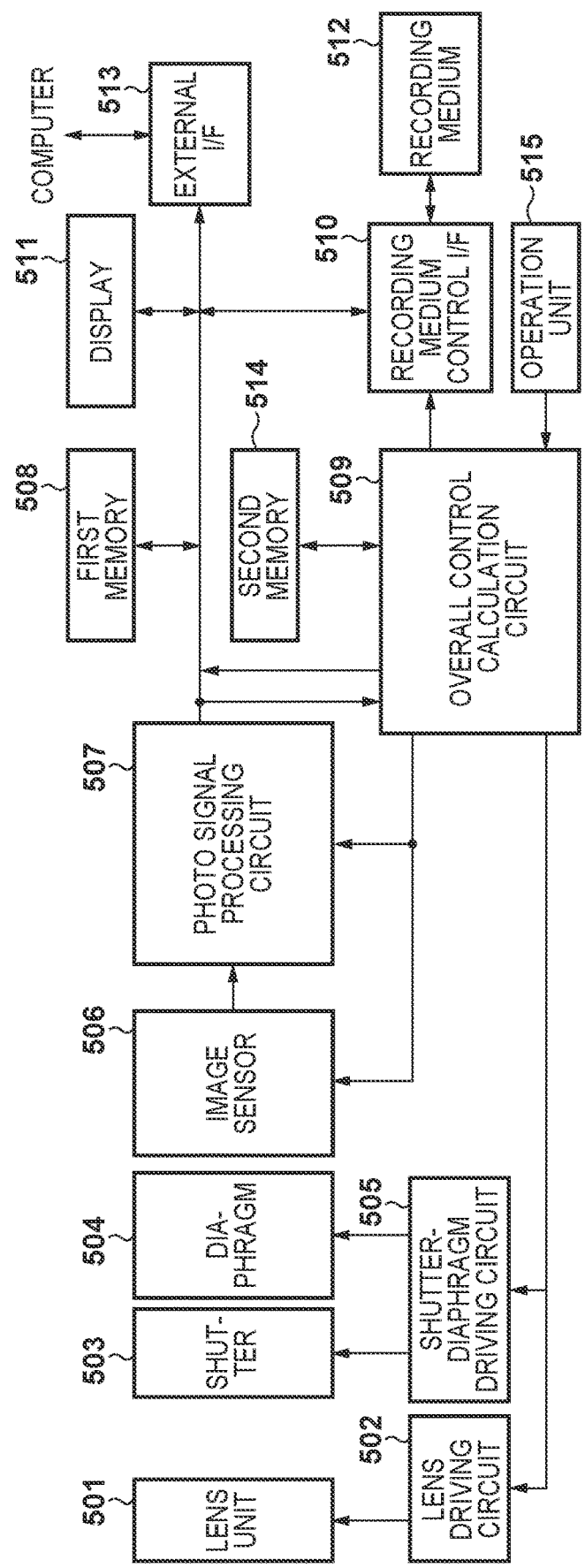
FIG. 5 is a block diagram showing a schematic configuration of an image capturing apparatus according to the embodiment.

FIG. 5 is a block diagram showing a schematic configuration of an image capturing apparatus having the image sensor 506 described using FIG. 1A, FIG. 1B, FIG. 4A, and FIG. 4B. In FIG. 5, a subject image that has passed through a lens unit 501 and a mechanical shutter (hereafter referred to as "shutter") 503 is adjusted to have an appropriate light amount by a diaphragm 504 and imaged onto a sensor surface of the image sensor 506.

The subject image that has been imaged onto the sensor surface of the image sensor 506 undergoes photoelectric conversion by the PD 201 as described above, then analog-digital conversion (A/D conversion) is performed in which the analog signal is converted to a digital signal, which is sent to the image signal processing circuit 507.

In the image signal processing circuit 507, various types of image signal processing are carried out such as low pass filter processing by which noise is reduced, shading processing, and WB processing and the like, as well as various types of correction processing and compression processing of image data.

The lens unit 501 is driven and controlled so as to perform zooming and focusing and the like using a lens driving circuit 502. The shutter 503 and the diaphragm 504 are driven and controlled by a shutter-diaphragm driving circuit 505. The overall control calculation circuit 509 performs control of the entire image capturing apparatus and various types of calculations. A first memory 508 temporarily stores image data.

A recording medium control interface (I/F) 510 carries out recording and reading out of image data with respect to a recording medium 512. A display 511 displays image data. The recording medium 512 is a detachable recording medium such as a semiconductor memory or the like and stores the image data that has been written in. An external interface (I/F) 513 is an interface for performing communications with external computers and the like.

A second memory 514 stores calculation results of the overall control calculation circuit 509. Information pertaining to drive conditions of the image capturing apparatus set by a user using an operation unit 515 is sent to the overall control calculation circuit 509 and control of overall of the image capturing apparatus is performed based on these sets of information. It should be noted that the lens unit 501 may be detachable from the image capturing apparatus.

Hereafter description is given regarding control in the image capturing apparatus having the aforementioned configuration.

First Embodiment

Description is given regarding drive control of an image capturing apparatus according to a first embodiment of the present invention.

Figure 6:
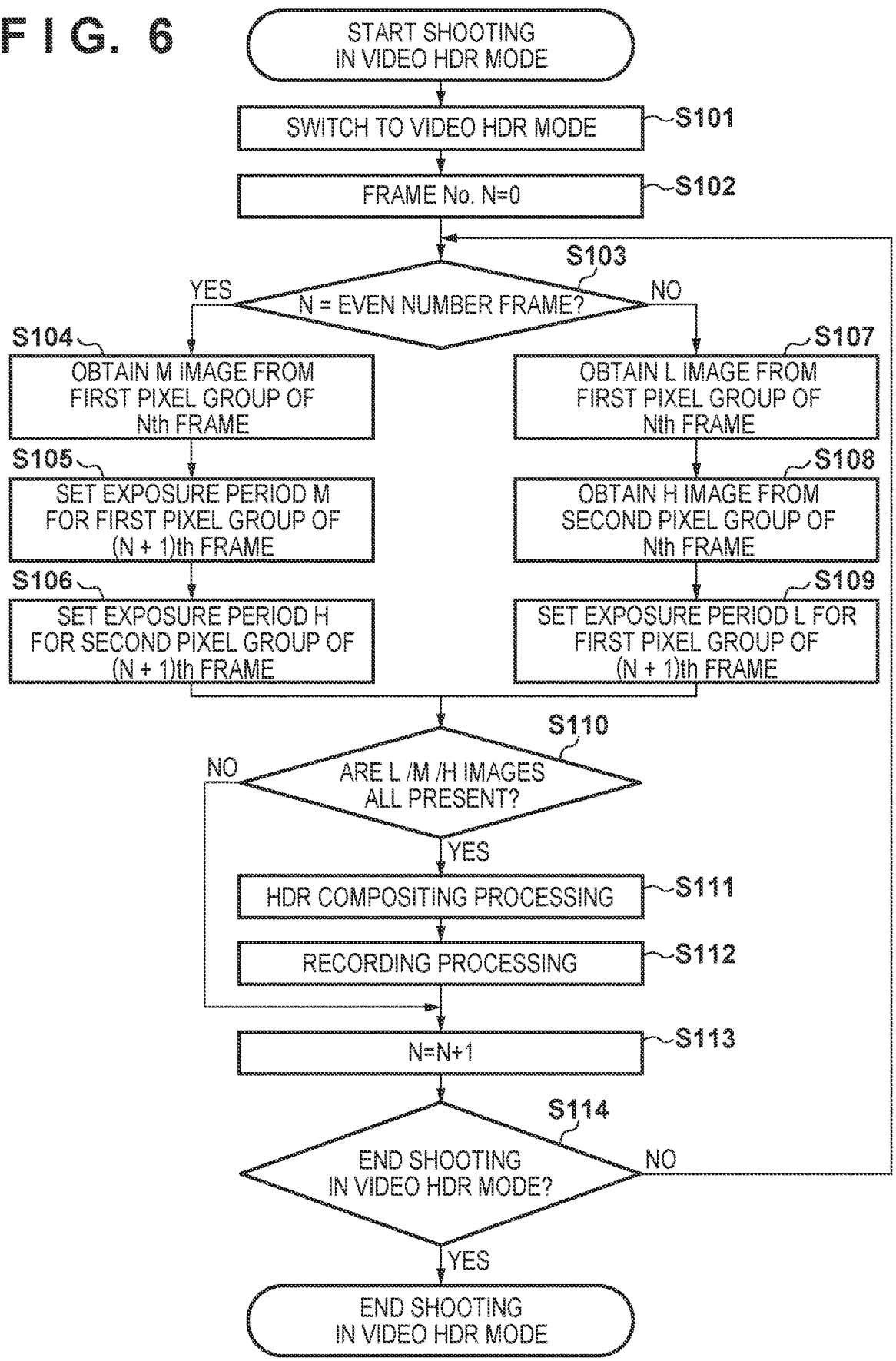
FIG. 6 is a flowchart showing shooting control in a video HDR mode according to a first embodiment.
Figure 7:
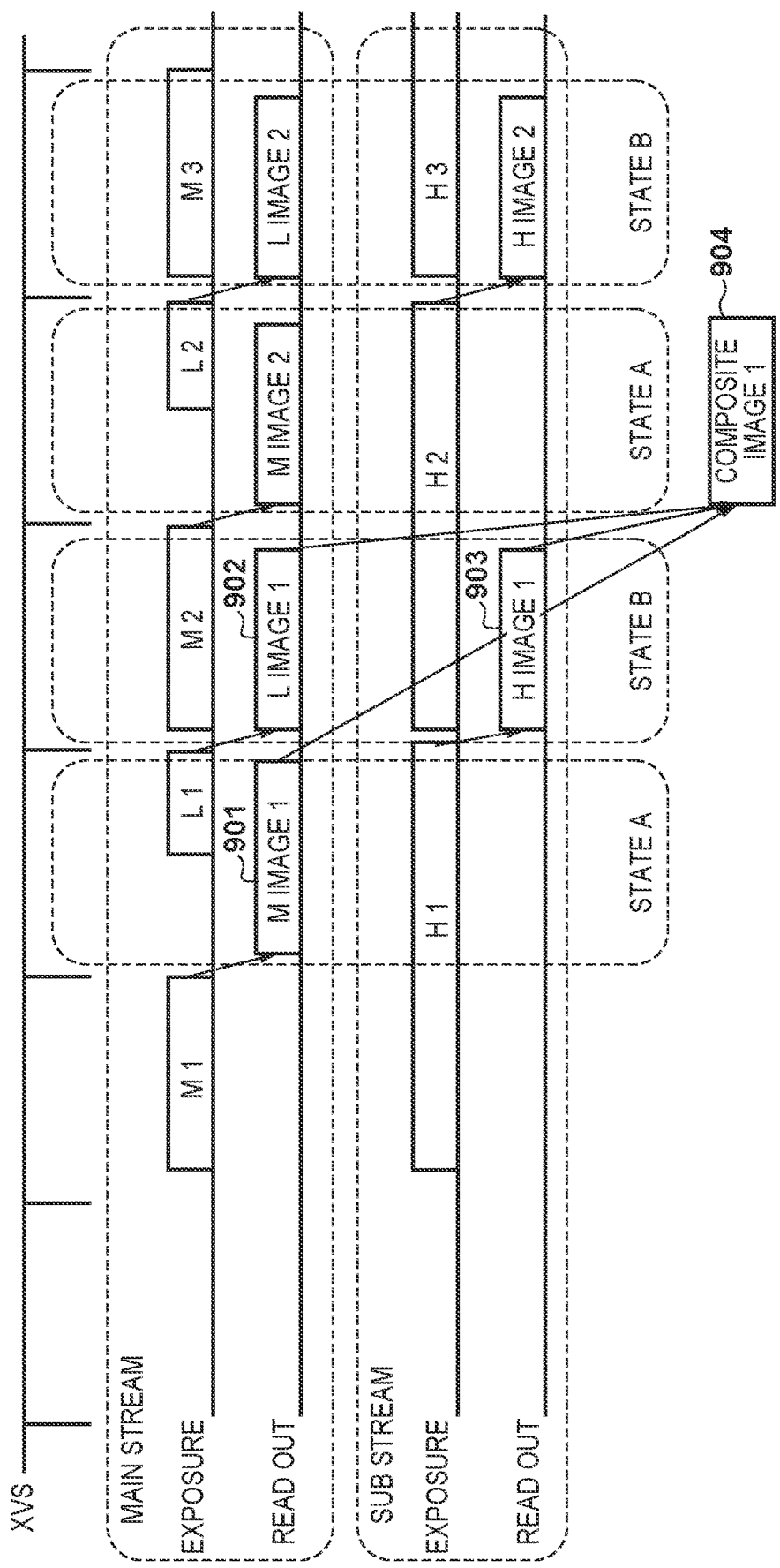
FIG. 7 is a timing diagram showing timings of exposure and reading out according to the first embodiment.

FIG. 6 is a flowchart showing shooting control in a video HDR mode according to the first embodiment, and FIG. 7 is a timing diagram showing timings of exposure and reading out according to the first embodiment. Hereinafter, description is given using FIG. 6 and FIG. 7 regarding shooting control in a video HDR mode according to the first embodiment.

In a case where video HDR mode has been selected in the image capturing apparatus, at step S101 the drive mode of the image sensor 506 is switched to video HDR mode. Next, at step S102, a frame number N by which the number of frames is counted is initialized (N=0). Once the frame number N has been initialized, a determination is performed at step S103 as to whether or not the current frame number N is an even number, and in a case where it is an even number, the procedure proceeds to step S104. It should be noted that here zero is handled as an even number.

At step S104, under the control of the overall control calculation circuit 509, a properly exposed image (M image) 901 is obtained from the first pixel group of the image sensor 506 and is outputted to the image signal processing circuit 507 via the main stream 121 for predetermined image signal processing to be executed and is saved in the first memory 508. The frame here corresponds to the state A in the video HDR mode of the image sensor 506.

Next, at step S105, under the control of the overall control calculation circuit 509, a proper exposure period (M) is set to the image sensor 506 as an exposure period of an image to be obtained from the first pixel group of the image sensor 506 and outputted via the main stream 121 in the next frame.

Further still, at step S106, under the control of the overall control calculation circuit 509, an over exposure period (H) is set to the image sensor 506 as an exposure period of an image to be obtained from the second pixel group of the image sensor 506 and outputted via the sub stream 122 in the next frame.

On the other hand, in a case where the current frame number N is an odd number at step S103, the procedure proceeds to step S107.

At step S107, under the control of the overall control calculation circuit 509, an under exposed image (L image) 902 is obtained from the first pixel group of the image sensor 506 and is outputted to the image signal processing circuit 507 via the main stream 121 for predetermined image signal processing to be executed, and moreover, at step S108, under the control of the overall control calculation circuit 509, an over exposed image (H image) 903 is obtained from the second pixel group of the image sensor 506 and is outputted to the image signal processing circuit 507 via the sub stream 122 for predetermined image signal processing to be executed, and these are saved in the first memory 508. The frame control here corresponds to the state B in the video HDR mode of the image sensor 506.

Next, at step S109, under the control of the overall control calculation circuit 509, an under exposure period (L) is set to the image sensor 506 as an exposure period of an image to be obtained from the first pixel group of the image sensor 506 and outputted via the main stream 121 in the next frame. It should be noted that the image to be outputted from the main stream 121 and the image to be outputted from the sub stream 122 may be switched.

Next, at step S110, the overall control calculation circuit 509 determines whether or not the images of three different exposures (the M image 901, the L image 902, and the H image 903) are all present in the first memory 508, and if they are all present, then the procedure proceeds to step S111. If they are not all present, the procedure proceeds to step S113.

It should be noted that in the first embodiment description is given regarding a case where the exposure periods are switched, but as well as the exposure period it is also possible to vary combinations of the ISO sensitivity and aperture.

At step S111, HDR compositing processing is executed. For example, the overall control calculation circuit 509 performs compositing by extracting image data corresponding to predetermined pixel level ranges (L, M, H) for the underexposed image (L image), the properly exposed image (M image), and the overexposed image (H image) from the image data constituting each image. In this way, HDR image data (a composite image) 904 is created in which the dynamic range has been expanded.

It should be noted that the compositing method is not limited to this and compositing may be performed using a commonly known method. The overall control calculation circuit 509 saves the thus-created HDR image data 904 in the first memory 508. In this event, the underexposed image (L image), the properly exposed image (M image), and the overexposed image (H image) that have been used to create the HDR image are deleted from the first memory 508.

Next, at step S112, after the HDR image data 904 is encoded as required, it is recorded in the recording medium 512 in a predetermined image data file format. Furthermore, the overall control calculation circuit 509 generates image data for use in display and outputs this to the display 511. The display 511 performs display after converting the HDR image data into signals suited to the display device.

At step S113, the frame number N is counted up and at step S114, a determination is performed as to whether or not selection of the video HDR mode has been turned off at the image capturing apparatus, and if it has not been turned off, the procedure returns to step S103, and the aforesaid processes are repeated until it is turned off. When it is turned off, processing finishes.

According to the first embodiment described above, a properly exposed image and an underexposed image obtained from the first pixel group of the image sensor 506 are alternately outputted from the main stream for each frame, and an overexposed image obtained from the second pixel group of the image sensor 506 is obtained from the sub stream every other frame. Thus, three images of different exposures can be obtained in a 2-frame time period.

By performing control of exposure and readout in this manner so as to obtain multiple different exposure periods in a smaller number of frames, it becomes possible to create HDR video having a high HDR effect for exposure differences while suppressing the influence of afterimages.

Second Embodiment

Next, description is given regarding a second embodiment of the present invention. In the above-described first embodiment, initially a properly exposed image is obtained from the first pixel group of the image sensor 506 and outputted from the main stream 121, after which an underexposed image was obtained and outputted. In contrast to this, in the second embodiment, description is given regarding a case where the order of the properly exposed image and the underexposed image obtained from the first pixel group of the image sensor 506 and outputted from the main stream 121 is switched.

Figure 8:
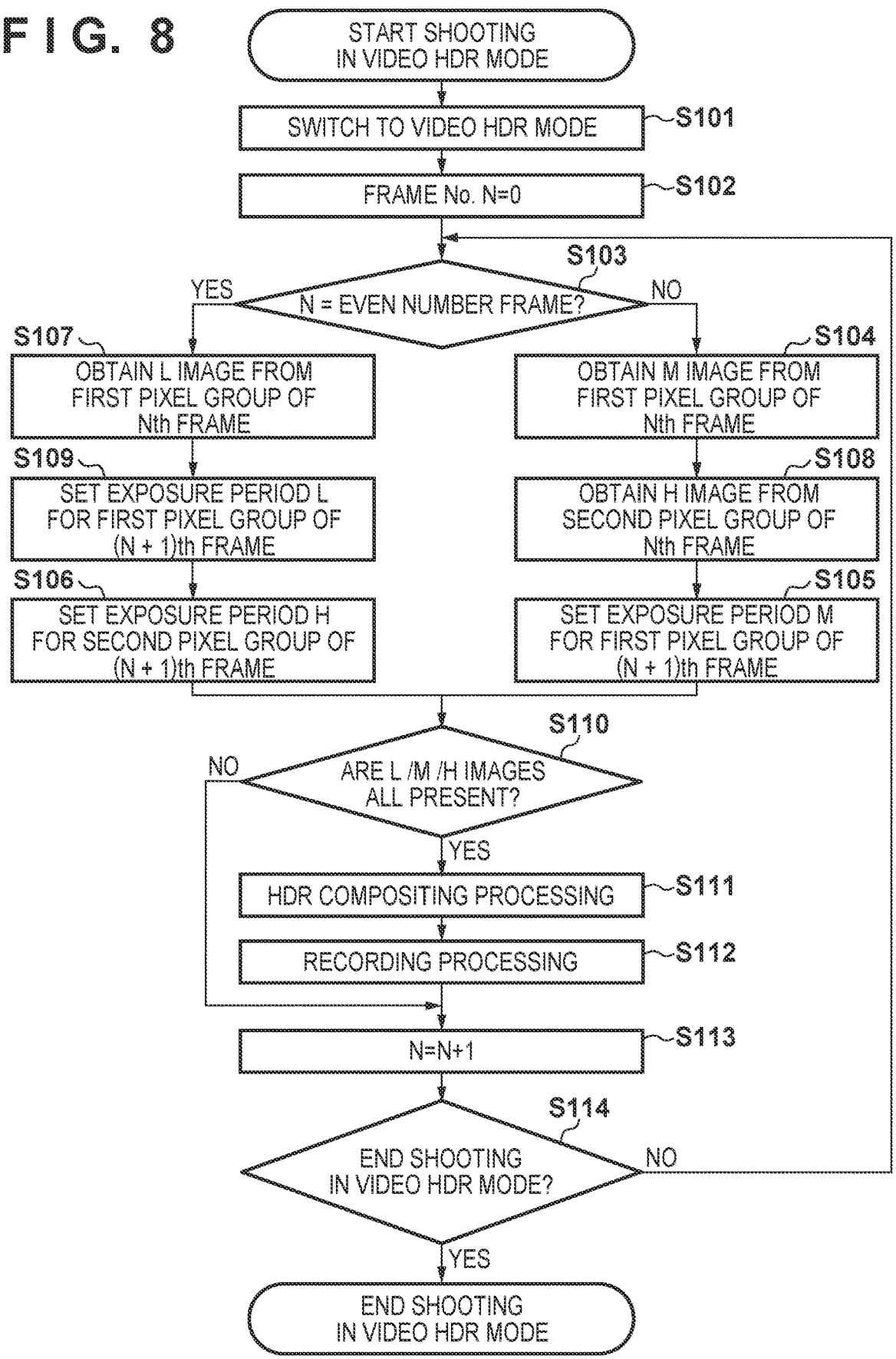
FIG. 8 is a flowchart showing shooting control in a video HDR mode according to a second embodiment.
Figure 9:
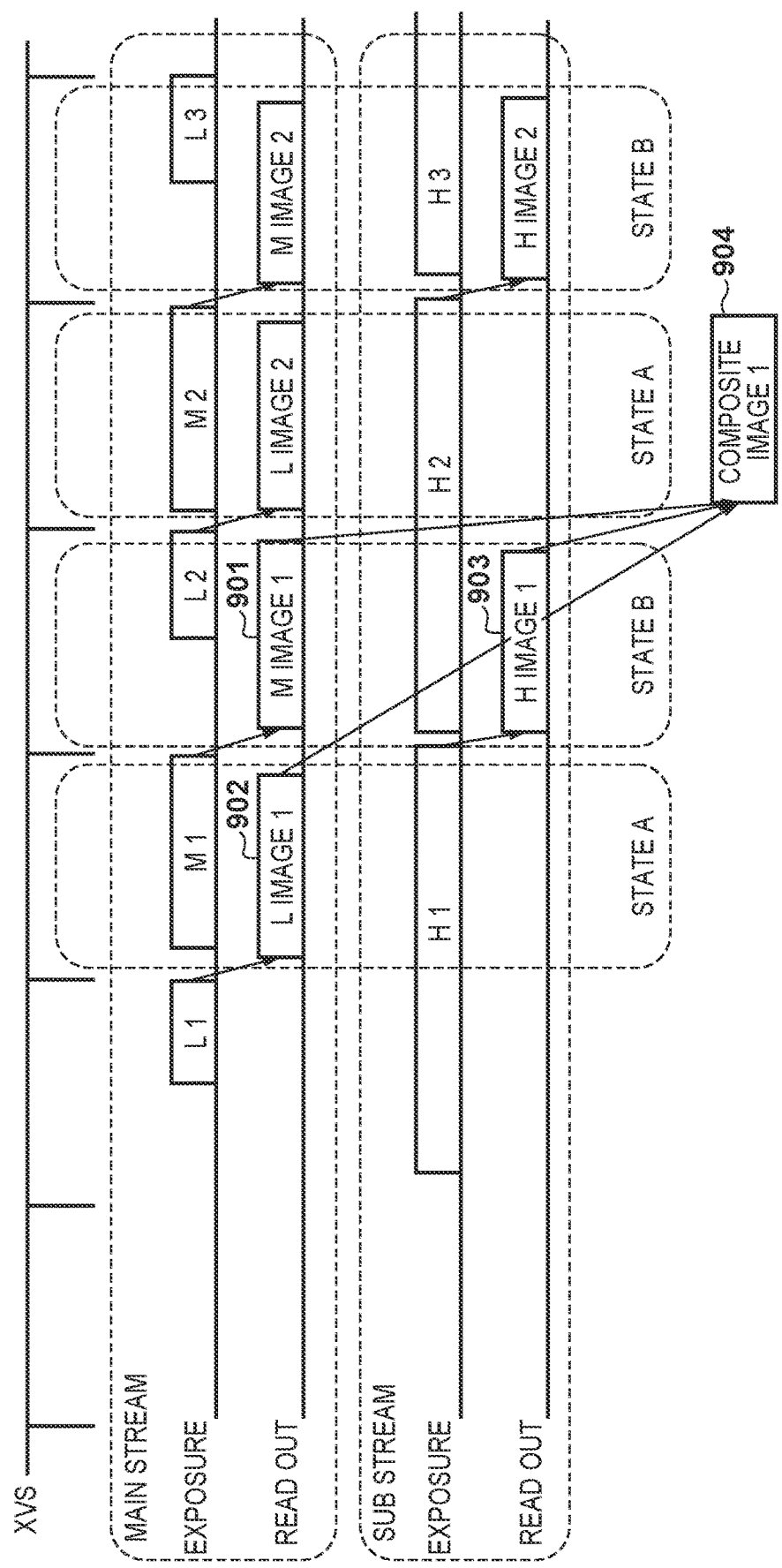
FIG. 9 is a timing diagram showing timings of exposure and reading out according to the second embodiment.

FIG. 8 is a flowchart showing shooting control in a video HDR mode according to the second embodiment, and FIG. 9 is a timing diagram showing timings of exposure and reading out according to the second embodiment. Hereinafter, description is given using FIG. 8 and FIG. 9 regarding shooting control in a video HDR mode according to the second embodiment. Processing from step S101 to step S103 is identical processing as in the first embodiment, and therefore description is omitted.

In a case where the current frame number N is an even number at step S103, the procedure proceeds to step S107. Then, at step S107, under the control of the overall control calculation circuit 509, an underexposed image (L image) 902 is obtained from the first pixel group of the image sensor 506 and is outputted to the image signal processing circuit 507 via the main stream 121 for predetermined image signal processing to be executed and is saved in the first memory 508. The frame here corresponds to the state A in the video HDR mode of the image sensor 506.

Next, at step S109, under the control of the overall control calculation circuit 509, an under exposure period (L) is set to the image sensor 506 as an exposure period of an image to be obtained from the first pixel group of the image sensor 506 and outputted via the main stream 121 in the next frame.

Further still, at step S106, under the control of the overall control calculation circuit 509, an over exposure period (H) is set to the image sensor 506 as an exposure period of an image to be obtained from the second pixel group of the image sensor 506 and outputted via the sub stream 122 in the next frame.

On the other hand, in a case where the current frame number N is an odd number at step S103, the procedure proceeds to step S104.

At step S104, under the control of the overall control calculation circuit 509, a properly exposed image (M image) 901 is obtained from the first pixel group of the image sensor 506 and is outputted to the image signal processing circuit 507 via the main stream 121 for predetermined image signal processing to be executed, and further still, at step S108, under the control of the overall control calculation circuit 509, an over exposed image (H image) 903 is obtained from the second pixel group of the image sensor 506 and is outputted to the image signal processing circuit 507 via the sub stream 122 for predetermined image signal processing to be executed, and these are saved in the first memory 508. The frame control here corresponds to the state B in the video HDR mode of the image sensor 506.

Next, at step S105, under the control of the overall control calculation circuit 509, a proper exposure period (M) is set to the image sensor 506 as an exposure period of an image to be obtained from the first pixel group of the image sensor 506 and outputted via the main stream 121 in the next frame. It should be noted that the image to be outputted from the main stream 121 and the image to be outputted from the sub stream 122 may be switched.

Processing from step S111 onward is the same as the processing in the first embodiment, and therefore description is omitted.

According to the second embodiment as described above, by obtaining an underexposed image from the first pixel group of the image sensor 506 then obtaining a properly exposed image and outputting these alternately from the main stream for each frame, the time difference between the underexposed image and the properly exposed image can be reduced.

Compared to FIG. 7 in the first embodiment, in the second embodiment the time difference between the exposure timing of the underexposed image and the exposure timing of the properly exposed image as shown in FIG. 9 is shortened compared to FIG. 7.

In this way, the afterimage sensation due to compositing processing when photographing moving objects can be even more suppressed, and it becomes possible to create HDR video of even higher quality.

Third Embodiment

Next, description is given regarding a third embodiment of the present invention. In the first and second embodiments described above, description was given regarding an example in which a properly exposed image and an underexposed image were obtained from the first pixel group of the image sensor 506 and outputted from the main stream 121, and an overexposed image was obtained from the second pixel group of the image sensor 506 and outputted from the sub stream 122. In contrast to this, in the third embodiment, description is given regarding a method in which images to be obtained are switched dynamically according to conditions and power consumption is reduced.

Figure 10:
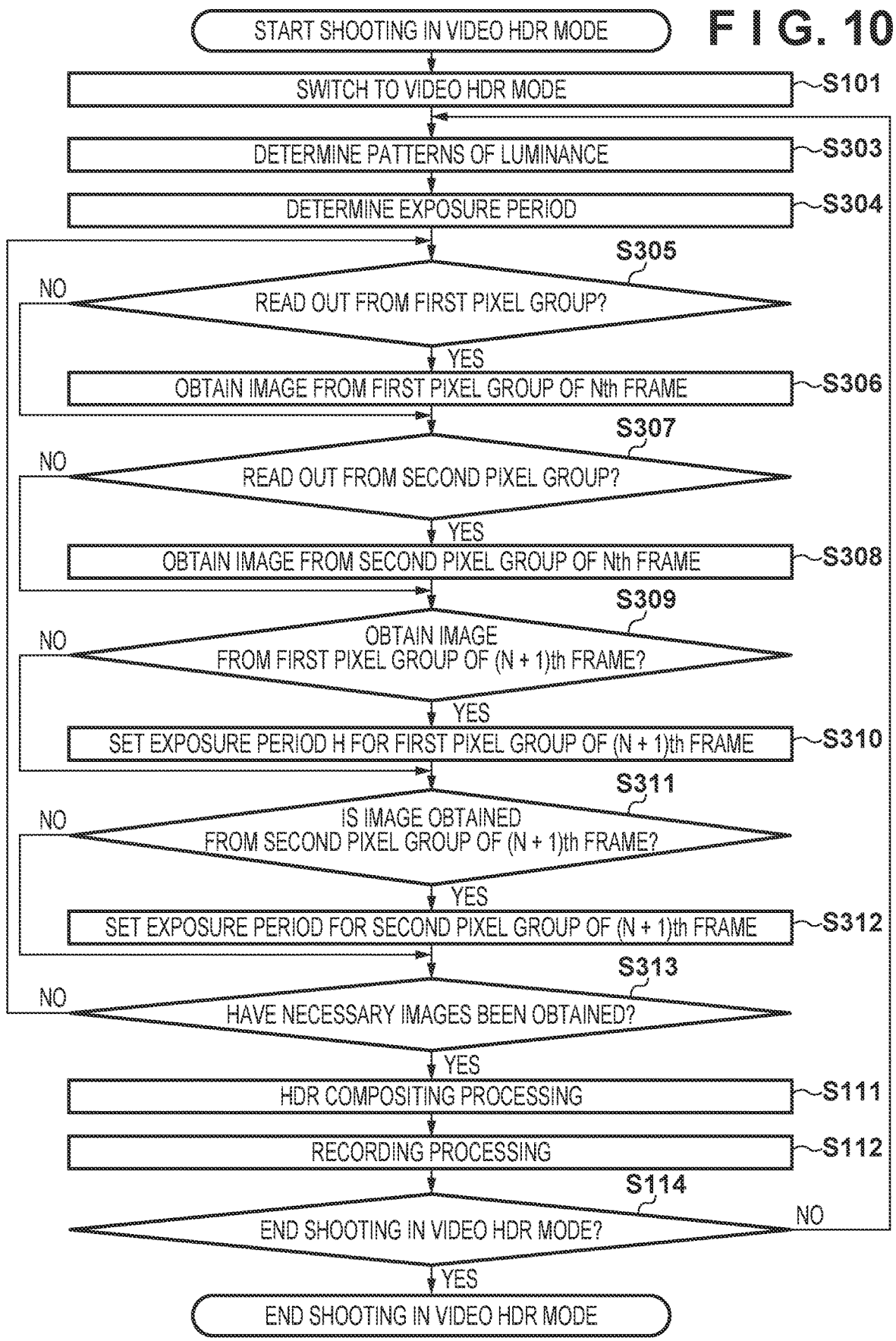
FIG. 10 is a flowchart showing shooting control in a video HDR mode according to a third embodiment.
Figure 11A:
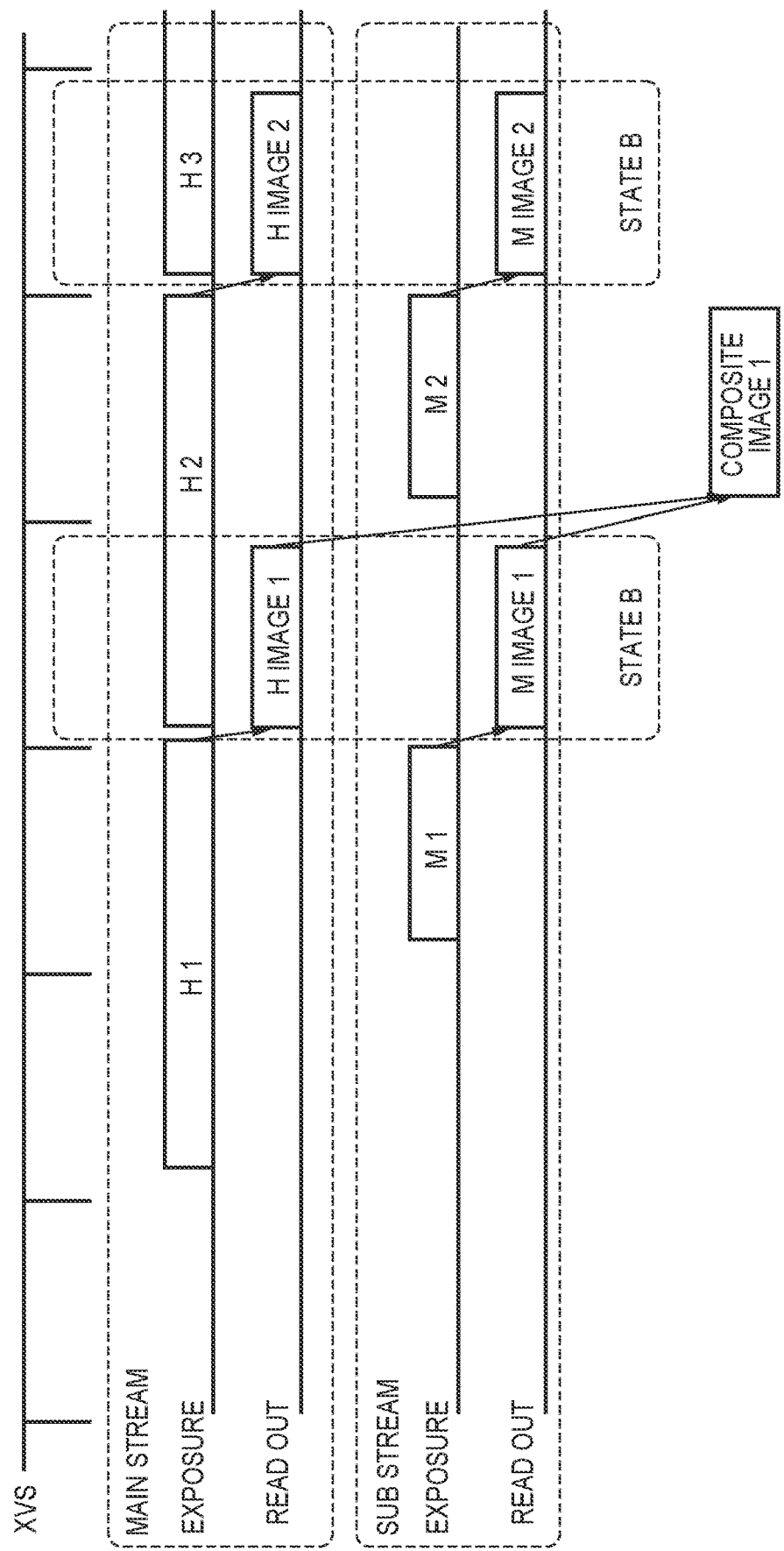

FIG. 10 is a flowchart showing shooting control in a video HDR mode according to the third embodiment, and FIG. 11A to FIG. 11C are timing diagrams showing timings of exposure and reading out according to the third embodiment. Hereinafter, description is given using FIG. 10 and FIG. 11A to FIG. 11C regarding shooting control in a video HDR mode according to the third embodiment. It should be noted that in FIG. 10, same step numbers are assigned to same controls as in FIG. 6, and description thereof is omitted as appropriate.

In a case where video HDR mode has been selected in the image capturing apparatus, at step S101 the drive mode of the image sensor 506 is switched to video HDR mode. Next, at step S303, histogram patterns of luminance values of a properly exposed image are determined to determine an exposure control method of the image sensor 506.

Figures 12A, 12B:
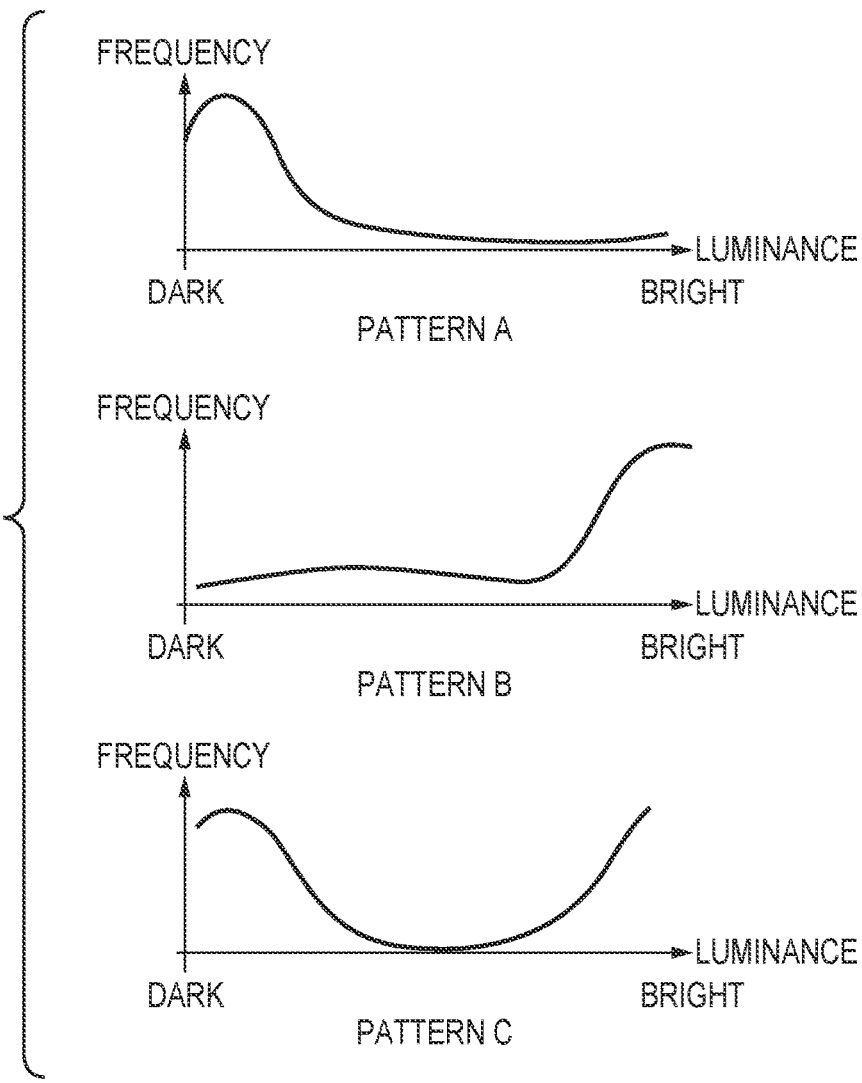
FIG. 12A and FIG. 12B are diagrams showing exposure control patterns according to the third embodiment.

In the third embodiment, a determination is performed as to which case from a pattern A to a pattern C in FIG. 12A applies to a histogram of luminance values of a shot image. It should be noted that the present embodiment is not limited to this and a configuration may be used in which, rather than only the luminance values of a shot image, a determination is performed of the exposure control method giving consideration to the remaining amount of battery charge.

Next, at step S304, a determination of exposure periods is performed in response to the pattern that has been identified. For example, a table such as that shown in FIG. 12B is used to carry out determinations of exposure periods.

Specifically, in a case where the luminance values are biased towards dark regions (low luminance) as in the pattern A in FIG. 12A, two types of exposure periods, namely a proper exposure period (M) and an overexposure period (H), are determined from the table in FIG. 12B. In this case, since there are few regions in the shooting scene at risk of blown out highlights, an HDR image can be obtained having excellent tone characteristics by suppressing blocked up shadows using two images, namely a properly exposed image and an overexposed image.

On the other hand, in a case where the luminance values are biased towards light regions (high luminance) as in the pattern B in FIG. 12A, two types of exposure periods, namely a proper exposure period (M) and an underexposure period (L), are determined from the table in FIG. 12B. In this case, since there are few regions in the photographic scene at risk of blocked up shadows, an HDR image can be obtained having excellent tone characteristics by suppressing blown out highlights using two images, namely a properly exposed image and an underexposed image.

Furthermore, in a case where the luminance distribution is a bipolarized distribution having both light regions and dark regions as in the pattern C in FIG. 12A, three types of exposure periods, namely a proper exposure period (M), and underexposure period (L), and an overexposure period (H), are determined from the table in FIG. 12B. In this way, blocked up shadows and blown out highlights are suppressed and an HDR image can be obtained having excellent tone characteristics.

Next, at step S305, a determination is performed as to whether or not to obtain an image from the first pixel group of the image sensor 506 and to output via the main stream 121, and in a case where it is to be obtained and outputted, the procedure proceeds to step S306, and in a case where it is not to be obtained, the procedure proceeds to step S307.

At step S306, under the control of the overall control calculation circuit 509, an image is obtained from the first pixel group of the image sensor 506 and is outputted via the main stream 121. This control is executed in a case where the main stream 121 is not unused or unsettable according to FIG. 12B.

Similarly, at step S307, a determination is performed as to whether or not to obtain an image from the second pixel group of the image sensor 506 and to output via the sub stream 122, and in a case where it is to be obtained and outputted, the procedure proceeds to step S308, and in a case where it is not to be obtained, the procedure proceeds to step S309.

At step S308, an image is obtained from the second pixel group of the image sensor 506 and outputted via the sub stream 122, and the images that have been outputted from the main stream 121 and the sub stream 122 are saved respectively in the first memory 508.

At step S309, a determination is performed as to whether or not to expose pixels of the first pixel group of the image sensor 506 corresponding to the main stream 121 at the (N+1)th frame, and in a case where exposure is to be performed, the procedure proceeds to step S310, and in a case where exposure is not to be performed, the procedure proceeds to step S311.

At step S310, under the control of the overall control calculation circuit 509, a setting of the exposure period is performed for the image to be obtained from the first pixel group of the image sensor 506 and outputted via the main stream 121 in the next frame. This control is executed in a case where exposure control of the (N+1)th frame is not unused or unsettable according to FIG. 12B, and the exposure period to be set here was is an exposure period based on the pattern which was determined at step S304.

Similarly, at step S311, a determination is performed as to whether or not to expose pixels of the second pixel group of the image sensor 506 corresponding to the sub stream 122 at the (N+1)th frame, and in a case where exposure is to be performed, the procedure proceeds to step S312, and in a case where exposure is not to be performed, the procedure proceeds to step S313.

At step S312, under the control of the overall control calculation circuit 509, a setting of the exposure period is performed for the image to be obtained from the second pixel group of the image sensor 506 and outputted via the sub stream 122 in the next frame.

For example, in a case where two images are to be obtained, namely a properly exposed image (M) and an overexposed image (H) in the case of the pattern A in FIG. 12B, timing control is performed as shown in FIG. 11A. In this way, control of exposure and reading out for the sub stream side occurs once in two frames, and therefore output of the sub stream side is stopped in frames in which there is no exposure and reading out, which enables power consumption to be reduced.

Similarly, in the case of the pattern B of FIG. 12B, two images are to be obtained, namely a properly exposed image (M) and an underexposed image (L). In this case, timing control is as shown in FIG. 11B, and output is stopped for both the main stream and the sub stream one time in two times so that power consumption is reduced.

In a case of the pattern C in FIG. 12B, the timing control (FIG. 11C) is the same as in the first embodiment.

At step S313, a determination is performed as to whether or not the exposed images necessary for HDR compositing processing have been obtained. In the third embodiment, a determination is performed as to whether or not an image/images of the Nth frame and an image/images of the (N+1)th frame as shown in FIG. 12B have been obtained. If it is determined that the necessary exposed images have been obtained and compositing can be performed, the procedure proceeds to step S111, and if they are not complete, the procedure returns to step S305.

At step S111, HDR compositing processing is executed to create HDR image data, and at step S112, after the thus-created HDR image data is encoded as required, it is recorded in the recording medium 512 in a predetermined image data file format.

At step S114, a determination is performed as to whether or not selection of the video HDR mode has been turned off at the image capturing apparatus, and if it has not been turned off, the procedure returns to step S303, and this is repeated until it is turned off. When it is turned off, processing finishes.

In the third embodiment, it was assumed that a table such as that in FIG. 12B was stored in advance in the second memory 514, but there is no limitation to this.

According to the above-described third embodiment, the exposure periods of images to be outputted from the main stream and the sub stream are dynamically switched in response to distribution patterns of signals that have been captured under proper exposure. In this way, by stopping output of the main stream/sub stream in unused frames, it is possible to reduce power consumption.

It should be noted that in the aforementioned example, in the case of the pattern of FIG. 11B, a properly exposed image (M) and an underexposed image (L) were read out every other frame, but it is also possible to read out a properly exposed image (M) and an underexposed image (L) in every frame. In that case, HDR video of high temporal resolution can be created.

Furthermore, in the first through third embodiments, description was given regarding a case where HDR compositing was performed by obtaining images of three different exposure periods in every two frames from two streams, but the present invention is not limited to this. The present invention is applicable also in cases where compositing is performed, for example, by obtaining images of four or more different exposure periods from three or more streams and using three or more frames (a frame period of multiple times).

Furthermore, in the foregoing embodiments, description was given using an example of a case where the present invention was applied to a digital camera, but there is no limitation to this example. That is, the present invention may be applied to any device equipped with an image sensor. That is, the present invention is applicable as long as it is a device capable of capturing an image such as a portable phone terminal, a portable image viewer, a television provided with a camera, a digital photo frame, a music player, a game device, an electronic book reader or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-116380, filed on Jun. 19, 2018, and No. 2019-079569, filed on Apr. 18, 2019, which are hereby incorporated by reference herein in their entirety.

What is claimed is:

1. An image sensor, comprising:
a pixel area that includes a first pixel group constituted by a plurality of pixels, and a second pixel group constituted by a plurality of pixels different from the first pixel group;
a first output channel that outputs an image signal obtained from the first pixel group;
a second output channel that outputs an image signal obtained from the second pixel group; and
a driver that performs drive according to a first drive method in which the first pixel group is serially exposed in a first exposure period and a second exposure period shorter than the first exposure period and one of a first image signal obtained with the first exposure period and a second image signal obtained with the second exposure period is read out via the first output channel in a first period and the other of the first image signal and the second image signal is read out in a second period immediately following the first period, and in which the second pixel group is exposed in a third exposure period longer than the first exposure period and a third image signal obtained with the third exposure period is read out via the second output channel in a third period that is a combined period of the first period and the second period, and in which reading out of the third image signal and reading out of the first or the second image signal are performed in parallel.

2. The image sensor according to claim 1, wherein each of the first output channel and the second output channel has an analog/digital converter that converts image signals obtained from the first pixel group and the second pixel group, respectively, to digital signals.

3. The image sensor according to claim 1, comprising:
a first semiconductor chip on which the pixel area is arranged, and
a second semiconductor chip on which the first output channel, the second output channel, and the driver are arranged,
wherein the first semiconductor chip and the second semiconductor chip are electrically connected and layered.

4. An image capturing apparatus, comprising:
an image sensor having:
a pixel area that includes a first pixel group constituted by a plurality of pixels, and a second pixel group constituted by a plurality of pixels different from the first pixel group;
a first output channel that outputs an image signal obtained from the first pixel group;
a second output channel that outputs an image signal obtained from the second pixel group; and
a driver that performs drive according to a first drive method in which the first pixel group is serially exposed in a first exposure period and a second exposure period shorter than the first exposure period and one of a first image signal obtained with the first exposure period and a second image signal obtained with the second exposure period is read out via the first output channel in a first period and the other of the first image signal and the second image signal is read out in a second period immediately following the first period, and in which the second pixel group is exposed in a third exposure period longer than the first exposure period and a third image signal obtained with the third exposure period is read out via the second output channel in a third period that is a combined period of the first period and the second period, and in which reading out of the third image signal and reading out of the first or the second image signal are performed in parallel; and a generator that generates an image having an expanded dynamic range from a plurality of image signals outputted from the image sensor and obtained by performing exposure in a plurality of different exposure periods;

wherein the generator is implemented by an overall control calculation circuit.

5. The image capturing apparatus according to claim 4, further comprising:

a controller that determines a drive method based on a distribution of luminance of image signals obtained by performing exposure in the first exposure period, wherein the controller, determines to perform drive according to the first drive method in a case of a first pattern in which the luminance of the image signals is distributed in both a high luminance and a low luminance, in a case of a second pattern in which the distribution is biased toward low luminance, determines to perform drive according to a second drive method in which the first pixel group is exposed in the third exposure period and the third image signal obtained with the third exposure period is read out via either the first or the second output channel in the third period, and the second pixel group is exposed in the first exposure period and the first image signal obtained with the first exposure period is read out via the other of the first and the second output channel in the first period, and wherein reading out of the third image signal and reading out of the first image signal are performed in parallel, and in a case of a third pattern in which the distribution is biased toward high luminance, determines to perform drive according to a third drive method in which the first pixel group is exposed in the first exposure period and the first image signal obtained with the first exposure period is read out via either the first or the second output channel in either the first or second period, and the second pixel group is exposed in the second exposure period and the second image signal obtained with the second exposure period is read out via the other of the first and the second output channel in the same period as the first pixel group, and wherein reading out of the first image signal and reading out of the second image signal are performed in parallel; and the driver performs drive according to a drive method determined by the controller.

* * * * *